(12) United States Patent
Iizuka

(10) Patent No.: US 6,199,901 B1
(45) Date of Patent: Mar. 13, 2001

(54) AIR BAG APPARATUS

(75) Inventor: Kei Iizuka, Niihama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/244,101

(22) Filed: Feb. 4, 1999

(30) Foreign Application Priority Data

Feb. 5, 1998 (JP) .................................................. 10-024710

(51) Int. Cl.⁷ .................................................. B60R 21/32
(52) U.S. Cl. ............................ 280/735; 280/729; 701/45
(58) Field of Search .................................. 280/735, 729, 280/736, 731; 701/45; 180/273

(56) References Cited

U.S. PATENT DOCUMENTS

| | | | | |
|---|---|---|---|---|
| 4,243,248 | * | 1/1981 | Scholz et al. ........................ | 280/735 |
| 5,074,583 | * | 12/1991 | Fujita et al. ......................... | 280/735 |
| 5,174,599 | * | 12/1992 | Hull et al. ........................... | 280/731 |
| 5,330,226 | * | 7/1994 | Gentry et al. ........................ | 280/735 |
| 5,400,487 | * | 3/1995 | Gioutsos et al. ..................... | 280/735 |
| 5,411,289 | * | 5/1995 | Smith et al. ......................... | 280/735 |
| 5,770,997 | * | 6/1998 | Kleinberg et al. .................... | 701/45 |
| 5,796,177 | * | 8/1998 | Werbelow et al. .................... | 701/45 |

FOREIGN PATENT DOCUMENTS

| | | |
|---|---|---|
| 0 382 552 | 8/1990 | (EP) . |
| 3-548 | 1/1991 | (JP) . |

* cited by examiner

Primary Examiner—Michael Mar
Assistant Examiner—Lynda Jasmin
(74) Attorney, Agent, or Firm—Foley & Lardner

(57) ABSTRACT

An air bag apparatus comprises a driver seat air bag unit, a passenger seat air bag unit, a driver position detector, a front passenger position detector, and a control unit. The driver seat air bag unit is disposed ahead of a driver seat and has a driver seat air bag unfolded in a two-stage manner. The passenger seat air bag unit is disposed ahead of a front passenger seat and has a passenger seat air bag unfolded in a two-stage manner. The control unit controls second unfolding initiations of the air bags respectively according to the sitting positions. Accordingly, the second stage unfolding of the air bags are initiated at optimal times in accordance with the sitting positions of the driver and the front passenger. As a result, secure restraint of the driver and the front passenger effected by the air bags and reduction in pressure acting on the driver and the front passenger from the air bags are achieved simultaneously on both driver seat and front passenger seat.

14 Claims, 7 Drawing Sheets

AIR BAG APPARATUS

The contents of Application No. TOKUGANHEI 10-24710 filed on Feb. 5, 1998 in Japan on which the content and the priority of this application are based, is hereby incorporated by reference.

BACKGROUND OF THE INVENTION

The present invention relates to an air bag apparatus having air bag units for both of a driver seat and a front passenger seat of an automobile.

An art relating to the present invention is described in Japanese Patent Application Laid-Open No. 3-548.

SUMMARY OF THE INVENTION

The air bag apparatus disclosed in the Patent Application Laid-Open No. 3-548 is provided with an inflator for generating a unfolding (viz, inflating) output in a two-stage manner. In the inflator a second stage ignition is effected when a predetermined time has elapsed after a first stage ignition.

In the above air bag apparatus, however, a time of the second stage ignition is set regardless of the position of a passenger on a seat. Therefore, it has been difficult to simultaneously achieve secure restraint of both a driver and a passenger on a driver seat and a front passenger seat and reduction in pressures acting on the driver and the passenger from air bags corresponding to the driver seat and the front passenger seat.

In view of the above, an object of the present invention is to provide an air bag apparatus wherein the pressures acting on the driver and the passenger on the driver seat and the front passenger seat are reduced regardless of their positions.

In order to achieve the above object, an air bag apparatus according to the present invention comprises a driver seat air bag unit disposed ahead of a driver seat and having a driver seat air bag unfolded or inflated in a two-stage manner; a passenger seat air bag unit disposed ahead of a front passenger seat and having a passenger seat air bag unfolded or inflated in a two-stage manner; a detector detecting a sitting position of a driver on the driver seat; a detector detecting a sitting position of a passenger on the front passenger seat; and a control unit for controlling second unfolding initiations of the air bags respectively in accordance with the sitting positions detected by the detectors.

In the above configuration, one of the detectors detects the sitting position of the driver and the other of the detectors detects the sitting position of the passenger seat. The control unit controls the second stage unfolding starting times of the air bags respectively in accordance with the sitting positions of the driver and the passenger.

Accordingly, the second stage unfolding operations of the air bags start at optimal times corresponding to the sitting positions. As a result, secure restraints of the drover and the passenger and reduction in pressures acting on the drover and the passenger from the air bags can be achieved simultaneously on both the driver seat and front passenger seat.

DESCRIPTION OF THE PREFERRED EMBODIMENTS

Figure 1:
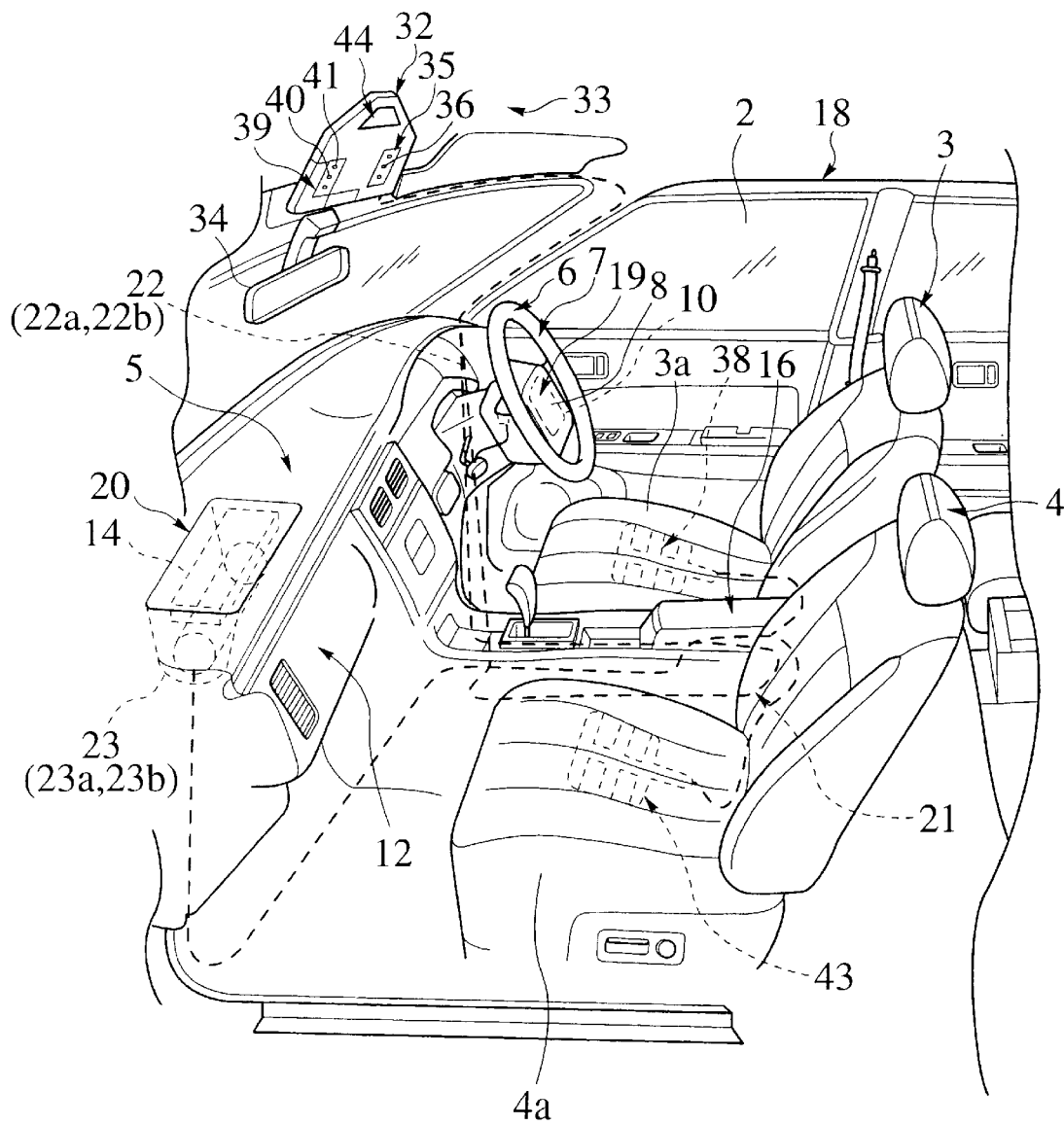
FIG. 1 is a partially sectioned perspective view showing an air bag apparatus of an embodiment according to the present invention.
Figure 2:
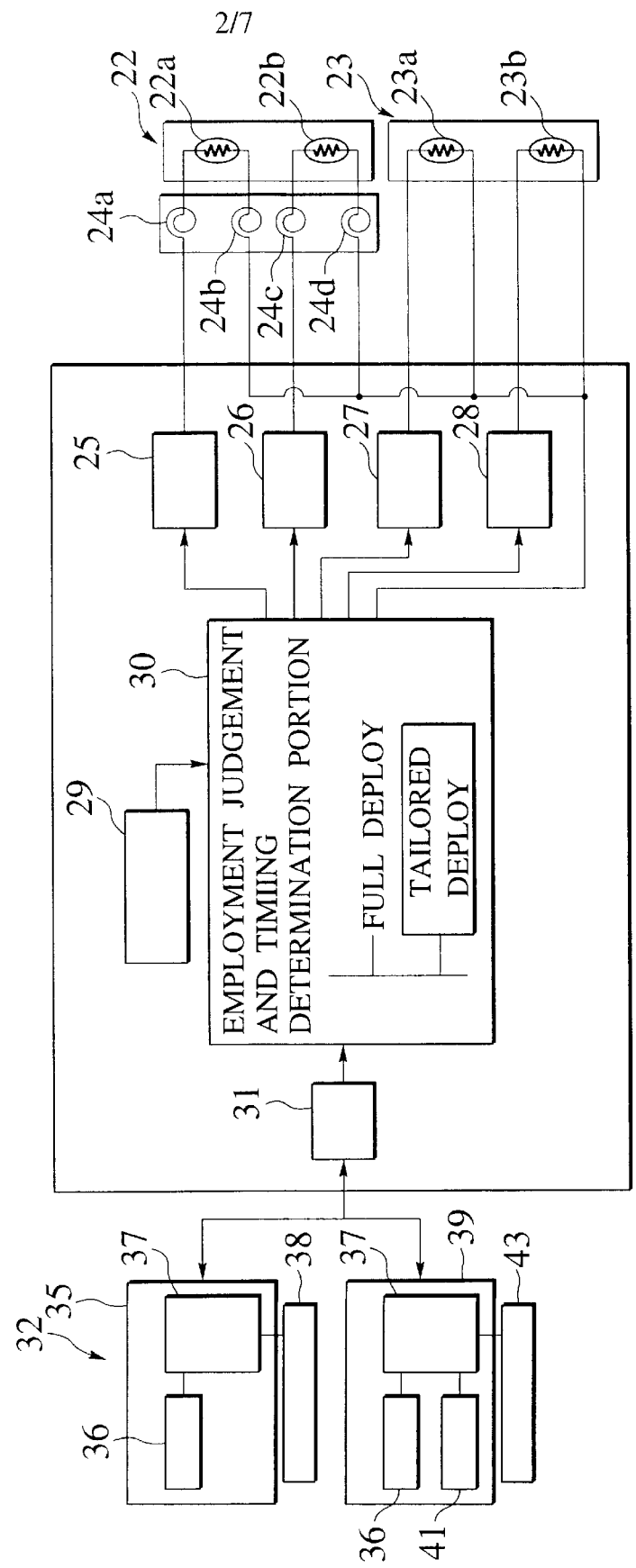
FIG. 2 is a block diagram showing the air bag apparatus of FIG. 1.

With reference to the drawings, one embodiment according to the present invention will be described below.

FIGS. 1 to 7 show an air bag apparatus of the embodiment of the present invention. A driver seat 3 and a front passenger seat 4 are disposed in a front section 2a in a compartment 2 of an automobile 18.

A steering wheel portion 6 is rotatably disposed on a dashboard 5 ahead of the driver seat 3. A rotating shaft of the steering wheel portion 6 is projected towards the driver seat 3. A dual stage driver seat air bag unit 19 is provided in a front surface portion 8 positioned almost at a central portion of a steering wheel 7 of the steering wheel portion 6.

The driver seat air bag unit 19 includes a bag-shaped air bag body (driver seat air bag) 10 for restraining a driver sitting on the driver seat 3 in a unfolded state and a driver seat dual stage inflator 22 for generating a two-stage unfolding output, which serves as a gas generating unit. The inflator 22 has a first stage inflator 22a and a second stage inflator 22b.

A glove box 12 is provided in the dashboard 5 ahead of the front passenger seat 4. A dual stage front passenger seat air bag unit 20 is disposed above the glove box 12 in the dashboard 5.

The passenger seat air bag unit 20 includes a bag-shaped air bag body (passenger seat air bag) 14 for restraining a passenger sitting on the front passenger seat 4 by inflating out from an upper surface of the dashboard 5 and a front passenger seat dual stage inflator 23 for generating a two-stage unfolding output, which serves as a gas generating unit. The inflator 23 has a first stage inflator 23a and a second stage inflator 23b.

In the driver seat air bag unit 19, the first stage inflator 22a and the second stage inflator 22b are connected to a control unit 21 disposed in a floor tunnel portion 16 through cables 24a, 24b and cables 24c, 24d of a spiral cable portion 24, respectively.

In the passenger seat air bag unit 20, the first stage inflator 23a and the second stage inflator 23b are connected to the control unit 21, respectively.

As shown in FIG. 1, the control unit 21 has a driver seat air bag first driver portion 25 for igniting the first stage inflator 22a of the inflator 22 and a driver seat air bag second driver portion 26 for igniting the first stage inflator 22b.

The control unit 21 has a passenger seat air bag first driver portion 27 for igniting the first stage inflator 23a of the inflator 23 and a passenger seat air bag second driver portion 28 for igniting the second stage inflator 23b.

The control unit 21 has an acceleration sensor 29 for detecting a collision acceleration occurring at a collision time of the automobile 18. In response to the acceleration of the acceleration sensor 29, a judgement and determination portion 30 of the control unit 21 judges whether or not the driver seat and passenger seat air bag driver portions 25, 26, 27, and 28 should be ignited and determines their ignition times.

Further, the control unit 21 has a communication interface 31 to which external sensors and the like can be connected.

In the present embodiment, a sensor module 32 is connected to the control unit 21.

The sensor module 32 is provided at a front edge portion of a roof portion 33 of the automobile 18. The sensor module 32 is disposed at a position where it does not interferes with other members positioned above a back mirror 34 and securely detects the sitting positions. The sensor module 32 includes a driver seat position detecting system 35, a front passenger seat position detecting system 39 and a front passenger air bag cut-off alarm lamp 44.

The driver seat position detecting system 35 has an ultrasonic sensor 36 and a position-detecting unit 37. The system 35 is interlocked to a driver seat sitting detecting sensor 38 provided in a seat portion 3a of the driver seat 3 to detect presence/absence of a driver sitting on the driver seat 3. Further, the system 35 detects whether a distance LD from the driver seat air bag unit 19 to the driver on the driver seat 3 is shorter than a predetermined distance L0 or the position of the driver is a normal sitting position where the distance LD is not shorter than the distance L0.

The front passenger seat position detecting system 39 has an ultrasonic sensor 40, an infrared sensor 41 and a position-detecting unit 42. The system 39 is interlocked to a front passenger seat sitting detecting sensor 43 provided in a seat portion 4a of the front passenger seat 4 to detect presence/absence of a passenger sitting on the front passenger seat 4. Also, the system 39 detects whether a distance LA from the passenger seat air bag unit 20 to the passenger on the front passenger seat 4 is shorter than a predetermined distance L1 or the position of the passenger is a normal sitting position where the distance LA is not shorter than the predetermined distance L1.

In the control unit 21, the judgement and determination portion 30 classifies delay time periods T1 to T4 elapsing from the first stage ignitions of the driver seat side and the front passenger seat side to second stage ignitions thereof into a timing for the normal sitting conditions (FULL UNFOLD) and a timing for the shorter sitting conditions (TAILORED UNFOLD) to set them. T1 is a delay time period in the normal sitting condition of the driver seat side, T2 is a delay time period in the shorter sitting condition of the driver seat side, T3 is a delay time period in the normal sitting condition of the front passenger seat side, and T4 is a delay time period in the shorter sitting condition of the front passenger seat side.

The relationship among T1 through T4 meets T1<T2 and T3<T4 as well as T1≦T4 and T2≦T3. Also, a value of T2 to T1 is larger than a value of T4 to T3 (T2/T1>T4/T3). In this embodiment, T1 is set to about 5 milliseconds, T2 is set to about 30 milliseconds, T3 is set to about 10 milliseconds, and T4 is set to about 20 milliseconds.

Figure 5:
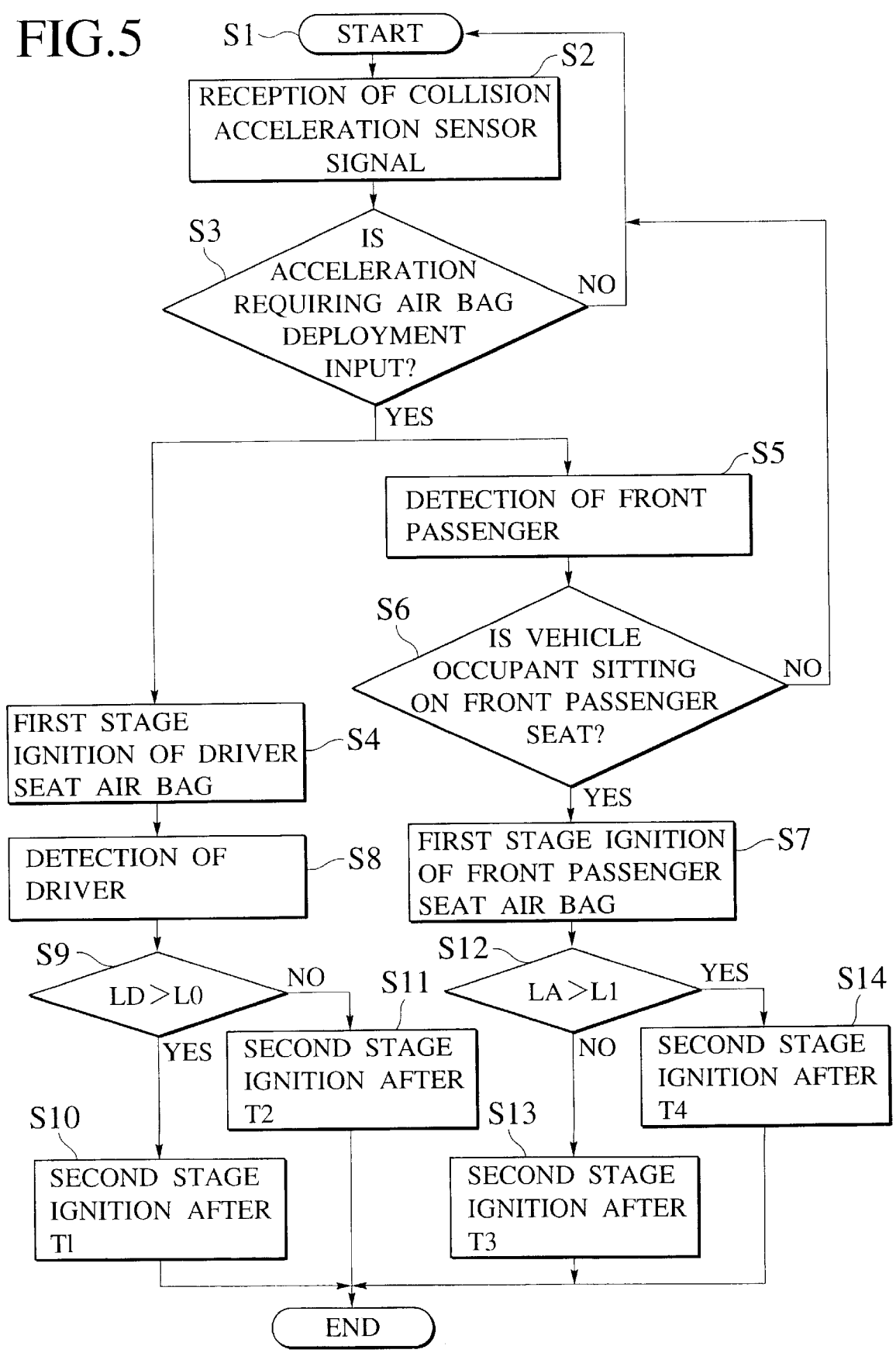
FIG. 5 is a flowchart of the air bag apparatus of FIG. 1.
Figure 6:
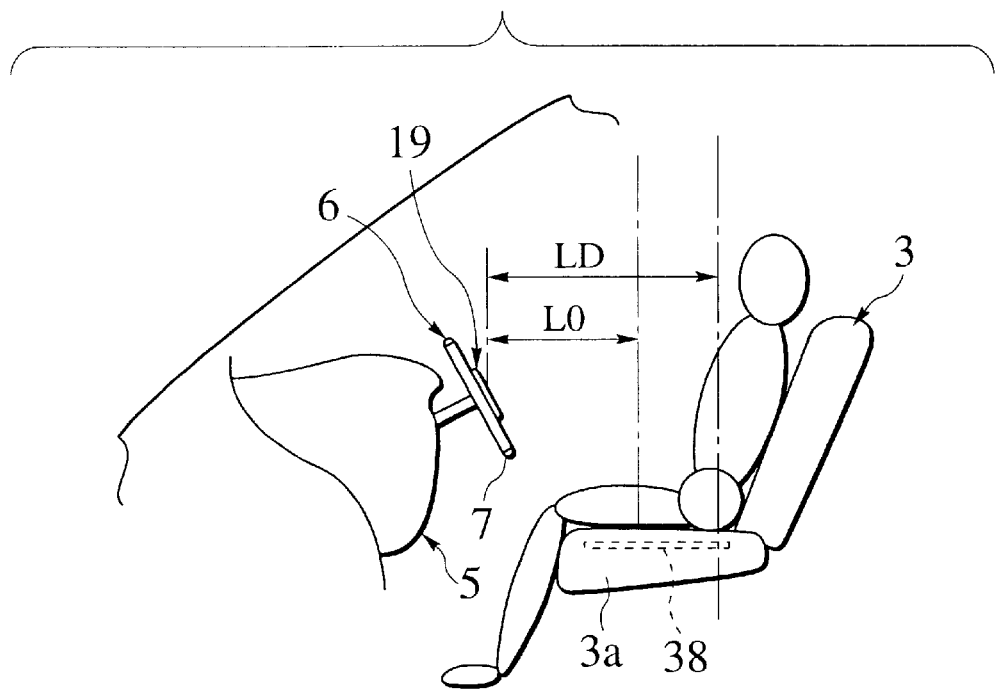
FIG. 6 is a descriptive diagram showing a driver seat on which a driver sitting at a normal position.
Figure 7:
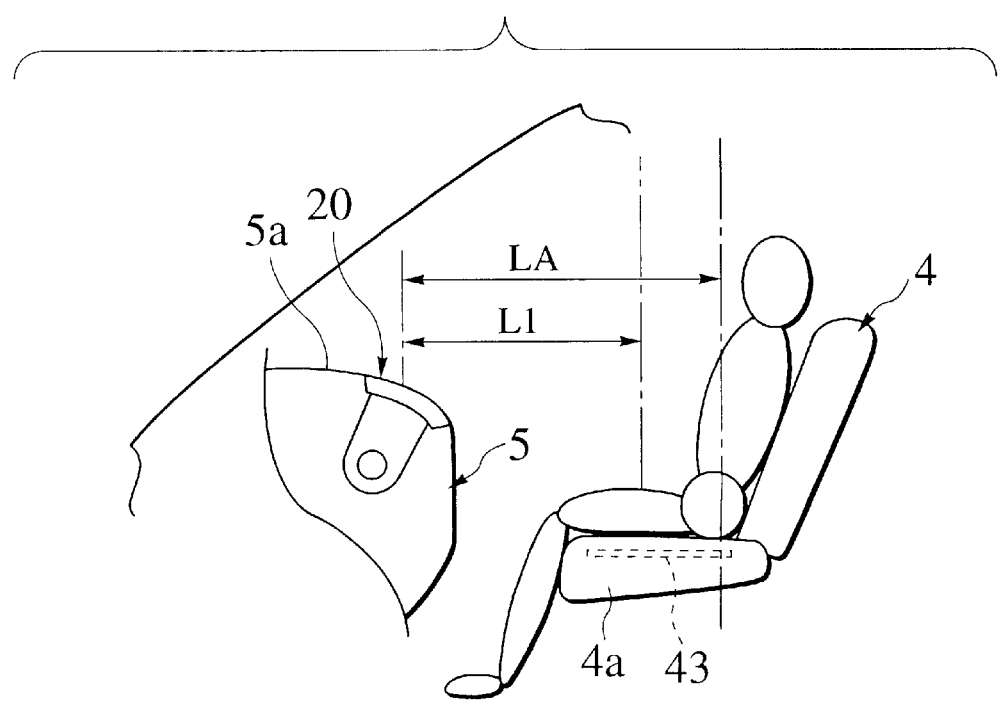
FIG. 7 is a descriptive diagram showing a front passenger seat on which a passenger is sitting at a normal position.

Operation of the air bag apparatus of the present embodiment will be described along a flowchart shown in FIG. 5.

First, in Step S1, control of the air bag apparatus starts In Step S2, in a case that a collision of the automobile 18 occurs, an acceleration at the collision time is detected by the acceleration sensor 29 provided in the control unit 21 to be input to the judgement and determination portion 30 as an acceleration signal.

In Step S3, a determination is made as to whether or not the air bags should be unfolded on the basis of the input acceleration signal. When the acceleration is within a range where the air bag unfolding is required for occupant protection, the control proceeds to the next Step S4 and Step S5. When the acceleration is outside the range, the control returns back to Step S1.

Figure 3:
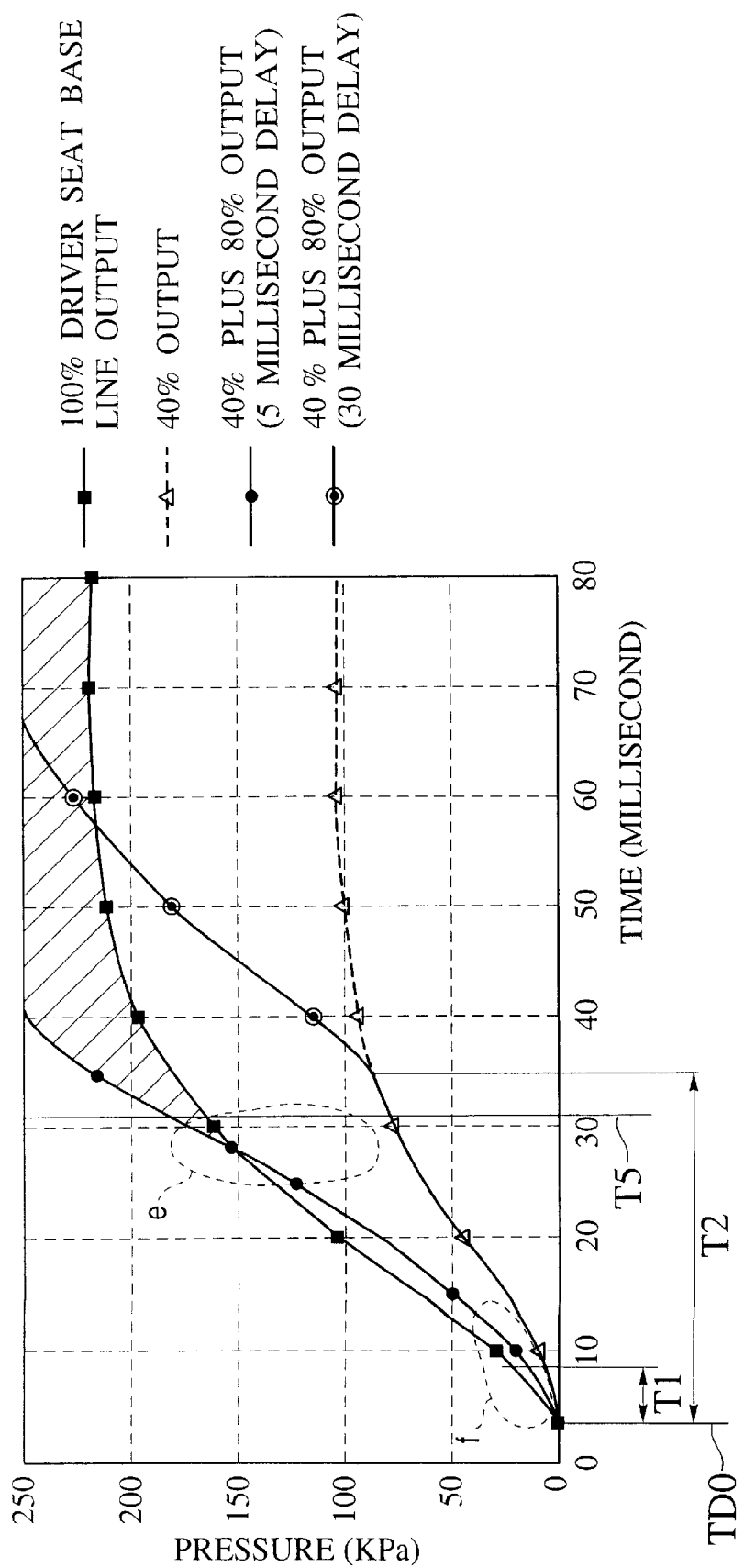
FIG. 3 is a graph showing a relationship between an internal pressure of an air bag body of a driver seat air bag unit and time.

In Step S4, an ignition current is sent to the first stage inflator 22a of the inflator 22 via the cables 24a, 24b of the spiral cable portion 24 by the driver seat air bag first driver portion 25 provided in the control unit 21. The first stage inflator 22a is ignited by the ignition current. Thereby, the air bag body 10 inflates out towards the driver seat 3 at about 40% output of a base line output serving as a base. In this embodiment, a time period TD0 in which the first stage inflator 22a is ignited is within about 4 milliseconds from the collision time, as shown in FIG. 3.

In Step S5, a detection is made by the infrared sensor 41 of the front passenger position detecting system 39 and the front passenger seat sitting detecting sensor 43 as to whether or not a passenger is sitting on the front passenger seat 4. In Step S6, the control proceeds to Step S7 when a passenger is sitting on the front passenger seat 4 and it returns back to Step S1 when no passenger is sitting on the seat 4.

Figure 4:
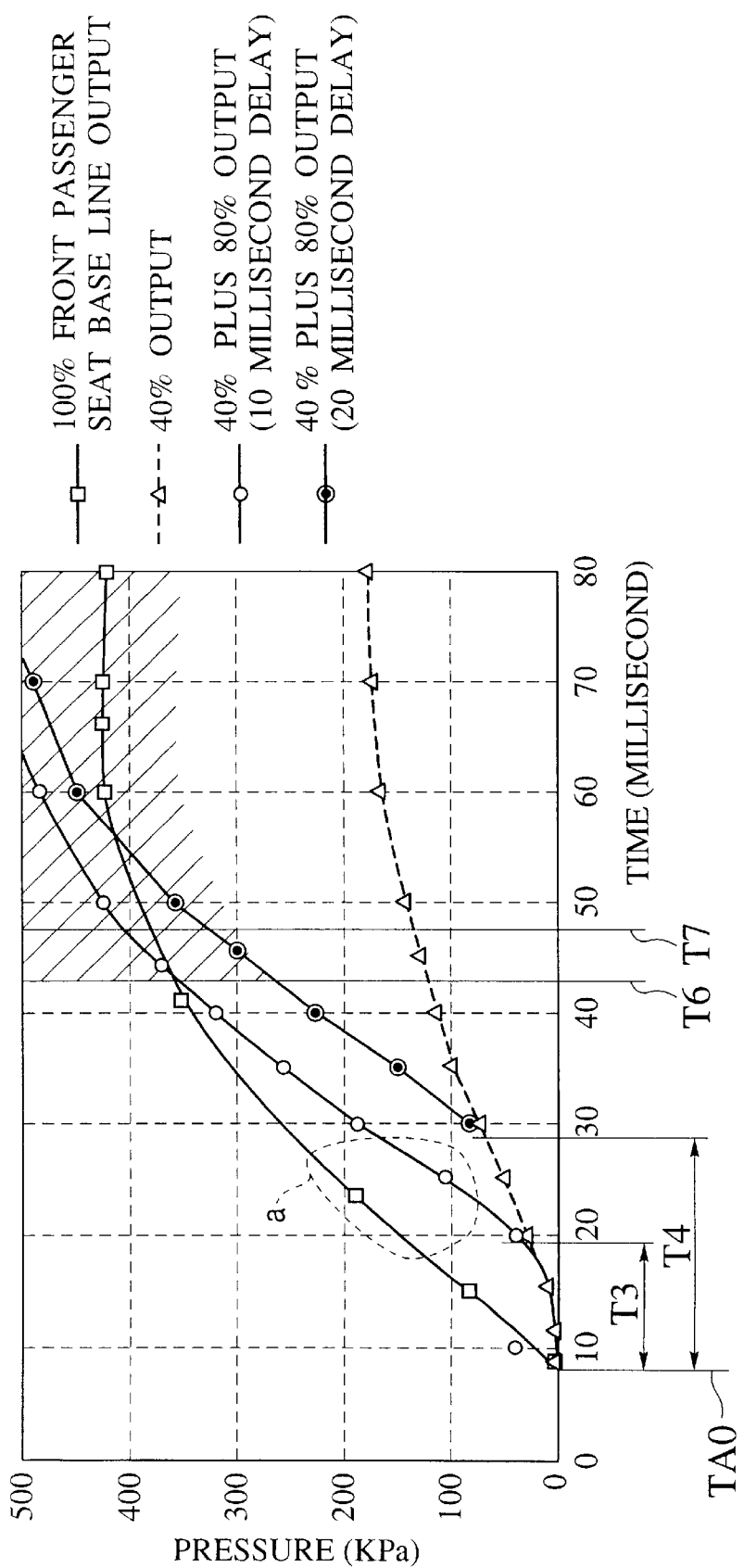
FIG. 4 is a graph showing a relationship between an internal pressure of an air bag body of a passenger seat air bag unit and time.

In Step S7, an ignition current is sent to the first stage inflator 23a of the inflator 23 by the front passenger seat first driver portion 27 provided in the control unit 21. The first stage inflator 23a is ignited by the ignition current. Thereby, the air bag body 14 inflates out towards the front passenger seat 4 at about 40% output of a base line output serving as a base. In this embodiment, as shown in FIG. 4, a time period TA0 in which the first stage inflator 23a is ignited is within about 9 milliseconds from the collision time.

Thus, the first stage ignition time of the driver seat air bag unit 19 is set to be earlier than the first stage ignition time of the passenger seat air bag unit 20. Accordingly, for the driver sitting on the driver seat 3 with the distance LD shorter than the predetermined distance L0 from the driver seat air bag unit 19, in a region f in FIG. 3 the breast and the like of the driver with the shorter or close distance LD are prevented from being pressed by the inflated air bag and colliding against the steering wheel 7 and the like of the steering wheel portion 6.

In Step S8, presence/absence of an driver on the driver seat 3 and the distance LD from the driver seat air bag unit 9 to the driver on the driver seat 3 are detected by the ultrasonic sensor 36 of the driver seat position detecting system 35 and the position detecting unit 37 interlocked to the driver seat sitting detecting sensor 38, and are input to the control unit 21.

In Step S9, a judgement is made by the judgement and determination portion 30 of the control unit 21 as to whether the distance LD is shorter than the predetermined distance L0 or the position of the driver on the driver seat 3 is the normal sitting position where the distance LD is not shorter than the distance L0.

When the driver is sitting at the normal sitting position, the control proceeds to Step S10, wherein an ignition current is sent to the second stage inflator 22b of the inflator 22 via the cables 24c, 24d of the spiral cable portion 24 by the driver seat second driver portion 26.

The second stage inflator 22b is ignited by the ignition current to inflate the air bag body 10 towards the driver seat 3 with about 80% output of the base line output serving as a base plus the about 40% output of the first stage inflator 22a. As shown in FIG. 3, in this embodiment the delay time period T1 elapsing from the ignition time of the first stage inflator 22a to the ignition time of the second stage inflator 22b is 5 milliseconds, and the second stage inflator 22b is ignited with a delay time of about 9 milliseconds from the collision.

When the sitting position of the driver is close to the steering wheel 7, that is, the distance LD is shorter than the predetermined distance L0, the control proceeds to Step S11, where an ignition current is sent to the second stage inflator 22b of the inflator 22 via the cables 24c, 24d of the spiral cable portion 24 by the driver seat second driver portion 26.

The second stage inflator 22b is ignited by the ignition current and the air bag body 10 is inflated out towards the driver seat 3 like the case of the normal sitting position. The ignition time of the second stage inflator 22b is delayed as compared with the case of the normal sitting position. As shown in FIG. 3, in this embodiment the delay time period T2 elapsing from the ignition of the first stage inflator 22a to the ignition time of the second stage inflator 22b at the close sitting position is 30 milliseconds, and the second stage inflator 22b is ignited with about 35 milliseconds delay from the collision. After the above sequential controls processes on the driver seat side are completed, the control flow is terminated (Step S15).

Also, in Step S5, the distance LA from the passenger seat air bag unit 20 to the passenger on the front passenger seat 4 is detected by the ultrasonic sensor 40 of the front passenger seat position detecting system 39 and the position detecting unit 42 interlocked to the front passenger seat sitting detecting sensor 43 to be input to the control unit 21.

In Step S12, a judgement is made by the judgement and determination portion 30 as to whether the distance LA from the passenger seat air bag unit 20 to the passenger on the front passenger seat 4 is shorter than the predetermined distance L1 or the position of the passenger is the normal sitting position where the distance LA is not shorter than the predetermined distance L1.

When the passenger is sitting at the normal sitting position, the control proceeds to Step S13, where an ignition current is sent to the second stage inflator 23b of the inflator 23 by the front passenger seat second driver portion 28.

The second stage inflator 23b is ignited by the ignition current so that the air bag body 14 is inflated out towards the front passenger seat 4 with about 80% output of the base line output serving as a base plus the about 40% output of the first stage inflator 23a. As shown in FIG. 4, in this embodiment, the delay time period T3 elapsing from the ignition time of the first stage inflator 23a to the ignition time of the second stage inflator 23b at the normal sitting position is 10 milliseconds, and the second stage inflator 23b is ignited with about 19 milliseconds delay from the collision.

Further, when the sitting position of the passenger is close to the dash board, the control proceeds to Step S14, where an ignition current is sent to the second stage inflator 23b of the inflator 23 by the front passenger seat second driver portion 28.

The second stage inflator 23b is ignited by the ignition current so that the air bag body 14 is inflated out towards the front passenger seat 4 in the same manner as the case of the normal sitting position. The ignition time of the second stage inflator 23b is delayed as compared with the normal sitting position. As shown in FIG. 4, in this embodiment, the delay time period T3 from the ignition time of the first stage inflator 23a to the ignition time of the second stage inflator 23b is 20 milliseconds, and the second stage inflator 23b is ignited with about 35 to 40 milliseconds delay from the collision. After the above sequential controls on the front passenger seat side is completed, the control flow is terminated (Step S15).

In this manner, the driver seat position detecting system 35 disposed ahead of the driver seat 3 detects the position of the driver on the driver seat 3 and the front passenger seat position detecting system 39 disposed ahead of the front passenger seat 4 detects the position of the passenger on the front passenger seat 4.

The second stage ignition times of the driver seat air bag unit 19 and the passenger seat air bag unit 20 are set by the control unit 21 in accordance with the sitting positions of the driver and the passenger detected by the respective driver seat and front passenger seat position detecting systems 35, 39.

Since the ignition times of the second stages are controlled corresponding to difference in restraint condition between the driver seat 3 and the front passenger seat 4 and difference in sitting position, overpressure acting on the breast and the like of a passenger is reduced.

Figure 8:
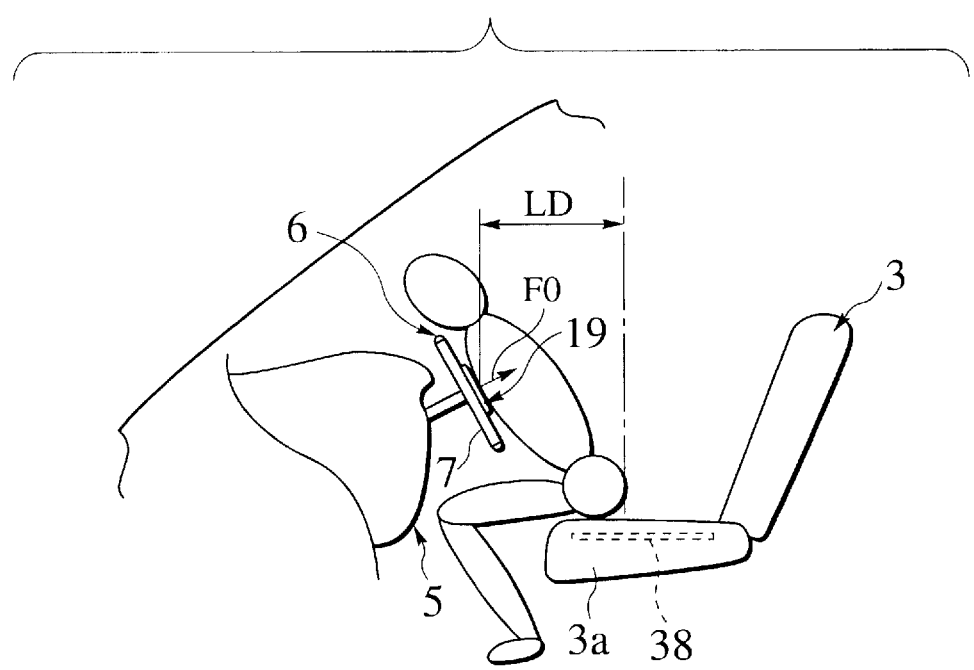
FIG. 8 is a descriptive diagram showing a driver seat on which a driver is sitting at a position close to a steering wheel.
Figure 9:
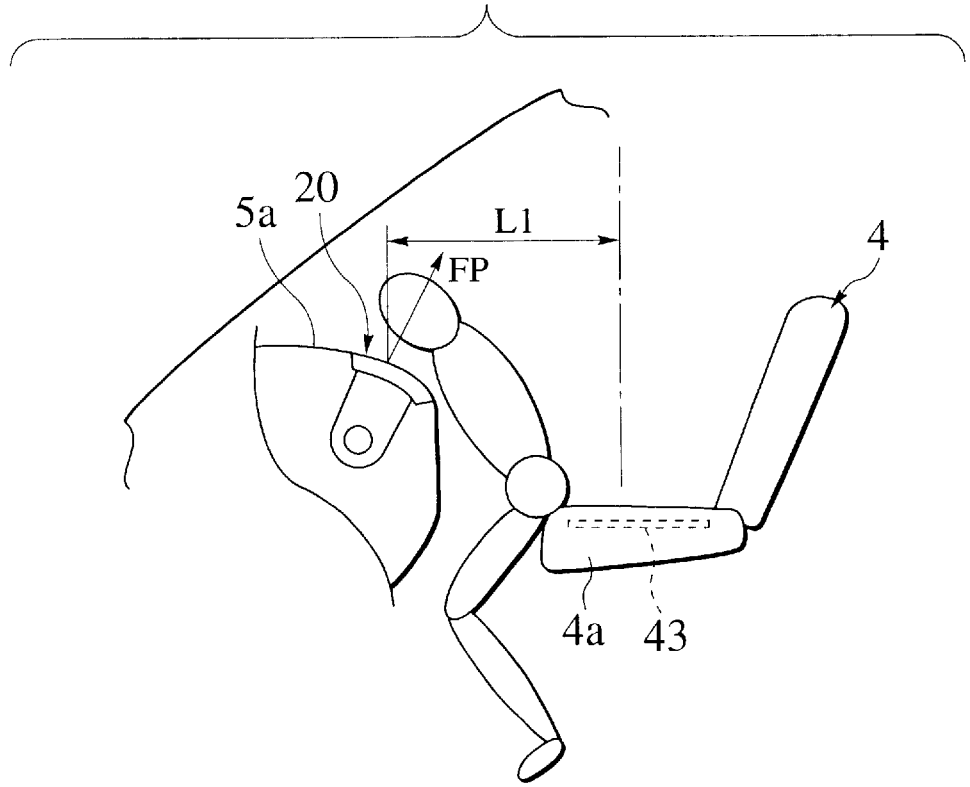
FIG. 9 is a descriptive diagram showing a front passenger seat on which a passenger is sitting at a position close to a dashboard.

Also, as shown in FIGS. 8, 9, when both the driver and the passenger sitting on the seats 3, 4 are sitting at the normal sitting positions with distances longer than the distances LD, LA, the control unit 21 controls the ignition times of the second stage inflators 22b, 23b such that the ignition timing of the driver seat air bag unit 19 is earlier than that of the passenger seat air bag unit 20.

As a result, as shown in FIG. 3, the pressure in the air bag body 10 of the driver seat air bag unit 19 is increased immediately up to a restrainable predetermined pressure to reach a predetermined pressure (about 160 KPa) by an initial restraining time period T5 of about 30 milliseconds or so, thereby restraining the driver on the driver seat 3.

As shown in FIGS. 8, 9, when the driver and the passenger on the driver seat 3 and the front passenger seat 4 are in close situations within the predetermined distances LD, LA from the respective air bag units 19, 20, the control unit 21 controls the ignition times of the second stage inflators 22b, 23b such that the ignition time of the second stage inflator 22b of the driver seat air bag unit 19 is later than that of the second inflator 23b of the passenger seat air bag unit 20.

Accordingly, the breast or the like of the driver on the driver seat 3 is suppressed to be pressed by an early unfolding of the air bag body 10 of the driver seat air bag unit 19.

Also, the pressure in the air bag body 14 of the passenger seat air bag unit 20 which has been ignited relatively early is increased up to a predetermined pressure (about 350 KPa),as shown with a curve plotted by double circles in FIG. 4, so that the passenger on the front passenger seat 4 is restrained within an initial restraining time period T7 (about 50 milliseconds or so in this embodiment) which is not so different from the initial restraining time period T6 (about 45 milliseconds or so in this embodiment) in the case of the normal sitting position.

Also, the delay time period from the first stage ignition effected by the control unit 21 up to the second stage ignition is controlled such that the delay time period of the driver seat air bag unit 19 is larger than that of the passenger seat air bag unit 20 (T2>T3 and T4). Therefore, in the close situation of the driver on the driver seat 3, after the driver is received at once by abutting on the air bag body 10 of the driver seat side which has been unfolded at a low pressure condition, the next ignition of the driver seat air bag unit 19 is delayed for a time period longer than that of the passenger seat air bag unit 20 until a rearward inclination of the driver begins. Then, after the rearward inclination of the driver begins due to reaction, pressure increase starts owing to the ignition of the second stage inflator 22.

As a result, a region e, shown in FIG. 3, where overpressure or the like to the breast or the like of the driver on the driver seat 3 is easy to occur and a region a, shown in FIG. 4, where overpressure or the like to the breast or the like of the passenger on the front passenger seat 4 is easy to occur can be avoided independently.

Furthermore, the ignition time (about 9 milliseconds from the collision) of the first stage inflator 22a of the driver seat side is set to be earlier than the ignition time (about 5 milliseconds from the collision) of the first stage inflator 23a of the front passenger seat side by the air bag apparatus. Accordingly, for example, even if a driver takes such an extreme attitude that the driver on the driver seat 3 puts his/her hands tightly on the steering wheel portion 7 to drive the vehicle as if he/she leans forward, while a rapid unfolding of the air bag 10 pressing the breast or the like of the driver is avoided, direct butting of the breast or the like against the steering wheel portion or the like is avoided, so that the driver is received by the air bag body 10 which has been unfolded in a low pressure condition. As a result, occurrence of overpressure to the breast shown in a region f in FIG. 3 is also avoided regardless of the sitting position of the driver.

Thus, in this embodiment, the ignition time of the second stage of the driver seat air bag unit 19 can be set so as to be delayed independently from the ignition timing of the second stage of the passenger seat air bag unit 20 by the control unit 21. Therefore, even if the first stage inflator 22a of the air bag unit 19 of the driver seat side with a relatively low base line pressure is actuated early, the delay control of the second stage inflator 22b is performed independently in accordance with the sitting positions of the driver regardless of the ignition time of the second stage inflator 23b of the passenger seat air bag unit 20 requiring a high pressure output due to its volume. Particularly, in the close situation of the driver, such a fine unfolding control that the delay time period T2 is set to be longer than the delay time period T4 and the ignition of the second inflator 23b is delayed until an inclination of the passenger begins can be performed in consideration of difference in restraint condition between the driver seat 3 and the front passenger seat 4.

As set forth above, though the embodiment of the present invention has been described in detail with reference to the drawings, a specific configuration of the present invention is not limited to this embodiment and the present invention includes various design modifications within the spirit and scope of the present invention.

In the above embodiment the ignition delay time period T4 of the second stage of the front passenger seat side in the close situation of the passenger is set to 20 milliseconds longer than the ignition delay time period T1, i.e. 10 milliseconds, of the second stage of the driver seat side in the normal sitting situation, but the present invention is not limited specifically to such a setting. If a time period for avoiding an injury to a passenger can be obtained, for example, the time periods T4 and T1 may be the same time period(about 5 milliseconds through 20 milliseconds) or the like.

Also, in the above embodiment, though the ignition delay time period T2 of the second stage of the driver seat side in the close situation is set to 30 milliseconds and is longer than the ignition delay time period T3, i.e. 10 milliseconds, of the second stage of the front passenger seat side in the normal sitting situation, but the present invention is not limited specifically to such a setting. Both the time periods T2 and T3 can be the same time, and the present invention can also be configured such that the ignition delay time period T2 of the second stage of the driver seat side in the close situation is set to be a longer ignition delay time period but the second stage ignition is performed after the rearward inclination begins.

What is claimed is:

1. An air bag apparatus, comprising:
   a driver seat air bag unit disposed ahead of a driver seat and having a driver seat air bag which inflates in a two-stage manner and wherein initiation of the first stage of inflation occurs a set time before initiation of the second stage of inflation;
   a passenger seat air bag unit disposed ahead of a front passenger seat and having a passenger seat air bag unfolded in a two-stage manner and wherein initiation of the first stage of inflation occurs a set time before initiation of the second stage of inflation;
   a detector detecting a driver distance between a driver on the driver seat and the driver seat air bag unit;
   a detector detecting a passenger distance between a passenger on the passenger seat and the passenger seat air bag unit; and
   a control unit which varies the respective initiations of the second stages of inflation of the driver seat air bag unit and the passenger seat air bag unit in accordance with the detected first and second distances.

2. An air bag apparatus according to claim 1, wherein the control unit sets the initiation of the second stage of inflation of the driver seat bag earlier than the initiation of the second stage of inflation of the passenger seat air bag when the driver distance between the the driver and the driver seat air bag unit is detected as being not less than a predetermined distance.

3. An air bag apparatus according to claim 2, wherein the control unit sets the initiation of the second stage of inflation of the driver seat air bag earlier than the initiation of the second stage of inflation of the passenger seat air bag when a distance between the passenger and the passenger seat air bag unit is not less than a predetermined distance.

4. An air bag apparatus according to claim 1, wherein the control unit sets the initiation of the second stage of inflation of the driver seat air bag later than the initiation of the second stage of inflation of the passenger seat air bag when the driver distance between the driver and driver seat air bag unit is less than a predetermined distance.

5. An air bag apparatus according to claim 4, wherein the control unit sets the initiation of the second stage of inflation of the driver seat air bag earlier than the initiation of the second stage of inflation of the passenger seat air bag when a distance between the passenger and the passenger seat air bag unit is less than a predetermined distance.

6. An air bag apparatus according to claim 1, wherein the control unit set the initiation of the second stage of inflation such that a second driver delay time period is longer than a first driver delay time period, wherein:
   the first driver delay time period is a time period elapsing from the initiation of the first stage of inflation of the driver seat bag to the initiation of the second stage of inflation thereof when the driver distance between the driver and the driver seat air bag unit is not less than a predetermined distance, and the second driver delay time period is a time period elapsing from the initiation of the first stage of inflation of the driver seat bag to the initiation of the second stage of inflation thereof when the driver distance between the driver and the driver seat air bag unit is less than a predetermined distance.

7. An air bag apparatus according to claim 1, wherein the control unit sets the initiation of the second stage of inflation of the passenger seat air bag such that a second passenger delay time period is longer than a first passenger delay time period, wherein:

the first passenger delay time period is a time period elapsing from the initiation of the first stage of the inflation of the passenger seat air bag to the initiation of the second stage of the inflation thereof when the passenger distance between the passenger and the passenger seat air bag unit is not less than a predetermined distance, and the second passenger delay time period is a time period elapsing from the initiation of the first stage of the inflation of the passenger seat air bag to the initiation of the second stage of the inflation thereof when the passenger distance between the passenger and the passenger seat air bag unit is less than a predetermined distance.

8. An air bag apparatus according to claim 1, wherein the control unit sets the initiations of the second stage of inflation of the driver seat air bag and the second stage of inflation of the passenger seat air bag such that a second passenger delay time period is equal to or longer than a first driver delay time period, wherein:

the first driver delay time period is a time period elapsing from the initiation of the first stage of inflation of the driver seat air bag to the initiation of the second stage of inflation thereof when the driver distance between the sitting position of the driver and the drive seat air bag unit is not less than a predetermined distance, and the second passenger delay time period is time period elapsing from an initiation of the first stage of inflation of the passenger seat air bag to the initiation of the second stage of inflation thereof when the passenger distance between the passenger and the passenger seat air bag unit is less than a predetermined distance.

9. An air bag apparatus according to claim 1, wherein the control unit sets the initiations of the second stages of inflation of the driver seat air bag and the passenger seat air bag such that a second driver delay time period is equal to or longer than a first passenger delay time period, wherein:

the second driver delay time period is a time period elapsing from an initiation of the first stage of inflation of the driver seat air bag to the intiation of the second stage of inflation thereof when the driver distance between the driver and the driver sat air bag unit is less than a predetermined distance, and the first passenger delay time period is a time period elapsing from an initiation of the first stage of inflation of the passenger seat air bag to the initiation of the second stage of inflation thereof when the passenger distance between the passenger and the passenger seat air bag unit is not less than a predetermined distance.

10. An air bag apparatus according to claim 1, wherein the control unit sets the initiations of the inflations of the driver seat air bag and the passenger seat air bag such that a value of a second driver delay time to a first driver delay time is larger than a value of a second passenger delay time to a first passenger delay time, wherein:

the first driver time delay time period is a time period elapsing from the initiation of the first stage of the inflation of the driver seat air bag to the initiation of the second stage of the inflation thereof when a distance between the driver and the driver seat air bag unit is not less than a predetermined distance, the second driver time delay time period is a time period elapsing from an initiation of the first stage of the inflation of the driver seat air bag to the initiation of the second stage of the inflation thereof when a distance between the driver and the driver seat air bag unit is less than a predetermined distance, the first passenger time delay time period is a time period elapsing from an initiation of the first stage of the inflation of the passenger seat air bag to the initiation of the second stage of the inflation thereof when a distance between the the passenger and the passenger seat bag unit is not less than a predetermined distance, and the second passenger time delay time period is a time period elapsing from an initiation of the first stage of the inflation of the passenger seat air bag to the initiation of the second stage of the inflation thereof when a distance between the the passenger and the passenger seat bag unit is less than a predetermined distance.

11. An air bag apparatus according to claim 1, wherein the control unit sets the initiation of the first stage of inflation of the driver seat air bag earlier than the initiation of the first stage of inflation of the passenger seat air bag.

12. An air bag apparatus according to claim 1, wherein each of the air bag units comprises a gas generating unit for generating an unfolding output of the second stage, and the control unit controls the gas generating unit.

13. An air bag apparatus, comprising:

a driver seat air bag unit disposed ahead of a driver seat and having a driver seat air bag which inflates in a two-stage manner such that initiation of the first stage of inflation of the driver seat air bag is followed by initiation of the second stage of inflation thereof;

a passenger seat air bag unit disposed ahead of a front passenger seat and having a passenger seat air bag which inflates in a two-stage manner such that initiation of the first stage of inflation of the passenger seat air bag is followed by initiation of the second stage of inflation thereof;

means for detecting a driver distance between a driver seated on the driver seat and the driver seat air bag unit, and a passenger distance between a passenger seated on the front passenger seat and the passenger seat air bag unit; and means for controlling the initiations of the second stages of inflation of the driver seat air bag and the passenger seat air bag with respect to the initiations of the first stages of inflation of the driver seat air bag and the passenger seat air bag in accordance with the driver and passenger distances detected by the detecting means.

14. A control method for an air bag apparatus, the air bag apparatus comprises a driver seat air bag disposed ahead of a driver seat and a passenger seat air bag disposed ahead of a front passenger seat, each of the air bags being inflated in a two-stage manner such that initiation of a first stage of the driver seat air bag preceeds initiation of a second stage of inflation thereof, and inatation of a first stage of inflation of the passenger seat air bag preceeds the second stage of inflation thereof, the method comprising the steps of:

detecting a driver distance between a driver seated on the driver seat and the driver seat air bag unit and a passenger distance between a passenger seated on the front passenger seat and the passenger seat air bag unit; and controlling the timing of the intiation of the second stage of inflation of the driver seat air bag and the timing of the intiation of the second stage of inflation of the passenger seat air bag in accordance with the detected driver and passenger distances.

* * * * *